Nov. 12, 1935.  A. NARATH  2,021,016

FILM SPLICING

Filed April 2, 1930.

Inventor:
Albert Narath,
by Charles E. Tullar
His Attorney.

Patented Nov. 12, 1935

2,021,016

UNITED STATES PATENT OFFICE 2,021,016

FILM SPLICING

Albert Narath, Berlin, Germany, assignor to General Electric Company, a corporation of New York Application April 2, 1930, Serial No. 441,044
In Germany April 10, 1929

4 Claims. (Cl. 274—41.6)

My invention relates to the splicing together of sound record films. It not infrequently becomes necessary to join together two separate films or two portions of the same film bearing sound or sound-picture records. In the case of films bearing only picture records this commonly is done by cutting off squarely the ends of the film to be joined and cementing them with a slight overlap. When a film bearing a sound record is joined in this manner an objectionable click or cracking sound is heard from the sound producer when the splice passes the light beam of the reproducing apparatus. This is accounted for by the fact that the light beam of the reproducer illuminates the film in a very narrow transverse line of light. The joined ends of the film being parallel with the line of light produced as they pass the light beam a sudden and marked change in the amount of light which passes on into the photo-electric cell and hence the loud cracking sound in the sound producer. It is the object of my invention to provide an improved manner of splicing films bearing sound records whereby the objectionable noise heretofore heard upon the passing of a splice may be avoided.

My invention will be better understood from the following description taken in connection with the accompanying drawing, and its scope will be pointed out in the appended claims.

Figure 1:
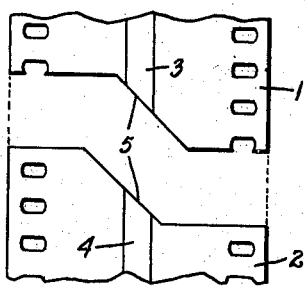
Figure 2:
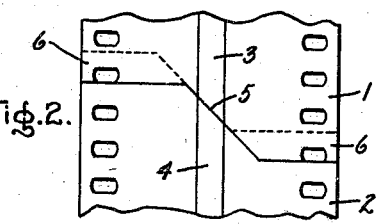
Figure 3:
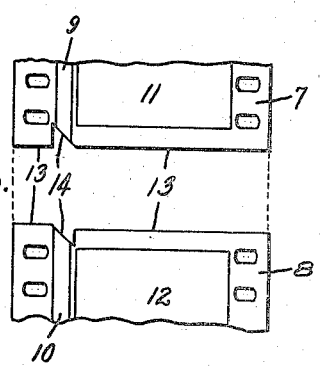

Referring to the drawing, Fig. 1 shows two films having a sound record thereon, the adjacent ends being cut in accordance with my invention; Fig. 2 shows the same films joined together; Fig. 3 is a view similar to Fig. 1 but showing films having both a picture and a sound record thereon and Fig. 4 is similar to Fig. 2 showing the spliced sound-picture film.

Films 1 and 1 of Fig. 1 each are shown as having a sound record only, the same comprising the bands 3 and 4 respectively. Both films have their ends cut obliquely through the sound record bands as shown at 5 so that when joined together and passed through the reproducer a small portion only of the film ends or joint intercepts the light at any one instant. Those parts of the films at the sides of the sound bands may be secured together in any suitable manner, for example, they may be cut transversely at an angle such that they overlap as shown at 6 in Fig. 2 and cemented together. Those portions of the films comprising the sound record bands may, if desired, be over-lapped slightly but preferably are simply brought together in abutting relation.

Figure 4:
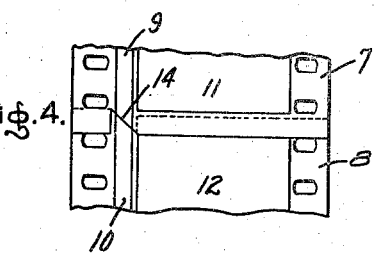

Referring now to Figs. 3 and 4 where I have shown my invention applied to picture-sound films, the two films 7 and 8 to be spliced have respectively the sound record bands 9 and 10 arranged at one side of the pictures 11 and 12. At those portions of the films at each side of the sound record band the films are cut transversely at right angles to their side edges as at 13 in the manner usually followed in splicing motion picture films. At the sound record bands, however, the films are cut obliquely as at 14. The portions of the films at the sides of the sound record bands may then be secured together as in Fig. 2 by overlapping and cementing. Obviously in cutting the films due regard must be had for the proper spacing of the sprocket holes of the two joined films and in the case of picture-sound films one must also have in mind the proper spacing of the pictures of the two films to avoid the necessity of re-framing when the splice passes through the projector.

What I claim as new and desire to secure by Letters Patent of the United States is:

1. The method of splicing films having photographic sound record bands thereon which comprises cutting the films through said sound record bands obliquely with reference to the edges of the films and perpendicularly with reference to the faces of the films and securing the films together with their cut ends at said bands in abutting relation.

2. The method of splicing films each having a portion bearing a series of pictures and a portion bearing a sound record band which comprises cutting each film transversely through the picture portion thereof and cutting each film through the sound record portion thereof obliquely with reference to the edge of the film and normal to the face of the film and securing the ends of the films together with those portions thereof cut normal to the face of the film in abutting relation to each other.

3. A spliced film having thereon a sound record, the joined ends of the film where the joint intersects said record being in abutting relation to each other and perpendicular to the faces of the film and extending obliquely to the edges of the film.

4. A spliced film having thereon a series of pictures and a sound record extending in parallel relation along the film, the joined ends of the film where the joint intersects the sound record being in abutting relation to each other and normal to the faces of the film and extending obliquely to the edges of the film whereby the joint appears as a single line across said record.

ALBERT NARATH.